(12) United States Patent
Fassolette et al.

(10) Patent No.: US 10,590,635 B2
(45) Date of Patent: Mar. 17, 2020

(54) MIXING UNIT AND MIXER TAP INCLUDING SUCH A MIXING UNIT

(71) Applicant: VERNET, Ollainville (FR)

(72) Inventors: Pierre-Olivier Fassolette, Corbeil Essonnes (FR); Thierry Maraux, Les Clayes Sous Bois (FR)

(73) Assignee: VERNET, Ollainville (FR)

( * ) Notice: Subject to any disclaimer, the term of this patent is extended or adjusted under 35 U.S.C. 154(b) by 44 days.

(21) Appl. No.: 15/750,321

(22) PCT Filed: Aug. 2, 2016

(86) PCT No.: PCT/EP2016/068366
§ 371 (c)(1),
(2) Date: Feb. 5, 2018

(87) PCT Pub. No.: WO2017/021386
PCT Pub. Date: Feb. 9, 2017

(65) Prior Publication Data
US 2018/0223508 A1    Aug. 9, 2018

(30) Foreign Application Priority Data
Aug. 3, 2015 (FR) ...................... 15 57481

(51) Int. Cl.
*E03C 1/04* (2006.01)
*G05D 23/13* (2006.01)
(Continued)

(52) U.S. Cl.
CPC .......... *E03C 1/041* (2013.01); *F16K 11/0787* (2013.01); *F16K 17/38* (2013.01); *F16K 31/002* (2013.01); *G05D 23/132* (2013.01)

(58) Field of Classification Search
CPC ............... G05D 23/232; G05D 23/134; G05D 23/1353; G05D 23/132; E03C 1/041; F16K 7/38; F16K 11/0787; F16K 31/002
See application file for complete search history.

(56) References Cited

U.S. PATENT DOCUMENTS

2007/0261738 A1* 11/2007 Mace .................... F16K 31/002
137/468

FOREIGN PATENT DOCUMENTS

CN    1811246 A    8/2006
CN    2906240 Y    5/2007
(Continued)

OTHER PUBLICATIONS

International Search Report, dated Nov. 10, 2016, in International Application No. PCT/EP2016/068366.

*Primary Examiner* — Marc E Norman
(74) *Attorney, Agent, or Firm* — Knobbe, Martens, Olson & Bear, LLP

(57) ABSTRACT

A mixing unit for a mixer tap has a first intake for a first incoming stream, and a second intake for a second incoming stream. The mixing unit mixes the first and second incoming streams in order to form an output stream, and has an outlet for the output stream. A thermostat includes a heat-sensitive portion and a translationally movable portion along an axis. A seal of the second intake is connected to the movable portion. A recess connects the outlet with the second intake and housing and is sealed by the heat-sensitive portion and the translationally movable portion. The outlet has an abutment to restrain the translational movement of the heat-sensitive portion along the axis, in a direction parallel to the axis and opposite to the seal. The abutment limits the movement of the heat-sensitive portion and the translationally movable portion outside of the recess to avoid breaking the tight seal.

18 Claims, 5 Drawing Sheets

(51) Int. Cl.
*F16K 17/38* (2006.01)
*F16K 31/00* (2006.01)
*F16K 11/078* (2006.01)

(56) References Cited

FOREIGN PATENT DOCUMENTS

| | | | |
|---|---|---|---|
| CN | 101893114 | A | 11/2010 |
| FR | 2 424 459 | A1 | 11/1979 |
| FR | 2 876 433 | A1 | 4/2006 |

* cited by examiner

10,590,635 B2

MIXING UNIT AND MIXER TAP INCLUDING SUCH A MIXING UNIT

PRIORITY AND CROSS REFERENCE TO RELATED APPLICATIONS

This application is the U.S. National Phase Application under 35 U.S.C. § 371 of International Application No. PCT/EP2016/068366, filed Aug. 2, 2016, designating the U.S. and published as WO 2017/021386 A1 on Feb. 9, 2017, which claims the benefit of French Application No. FR 1557481, filed Aug. 3, 2015.

FIELD

The invention relates to the field of valves and fittings for household use.

SUMMARY

The present invention relates to a mixing unit and a mixer tap comprising such a mixing unit.

BRIEF DESCRIPTION OF THE DRAWINGS

The invention will be better understood upon reading the following description, provided solely as a non-limiting and non-exhaustive example and done in reference to the drawings, in which.

DETAILED DESCRIPTION

Figure 1:
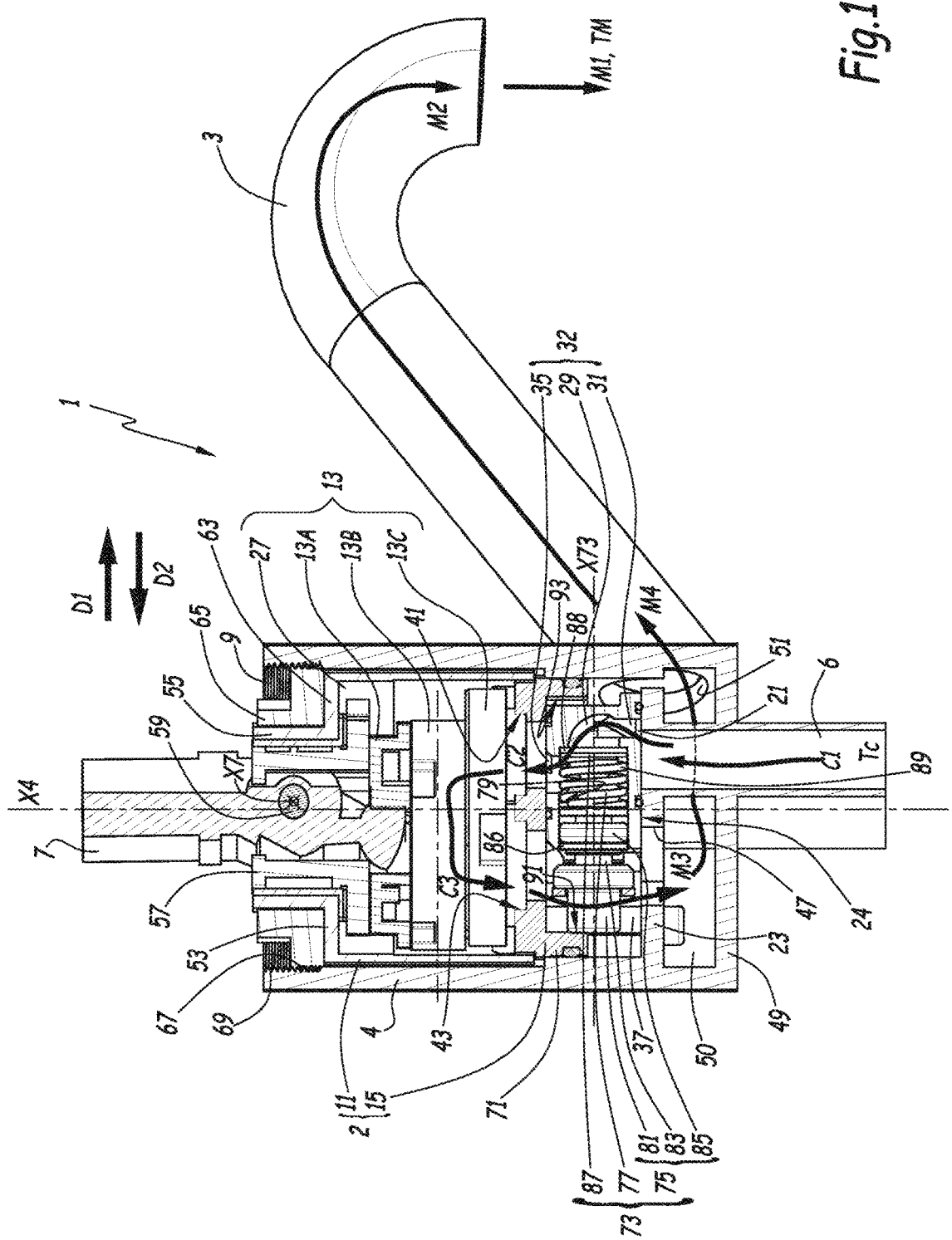
FIGS. 1 and 2 are longitudinal sectional views of a mixer tap comprising a mixing unit according to a first embodiment according to the invention.

The invention relates to the field of valves and fittings for household use. In particular, so-called "mixer" taps make it possible to emit a running stream of mixed water by mixing a stream of hot water and a stream of cold water within a cartridge mounted in the body of the tap. The respective flow rate of the cold water and hot water streams allowed into the cartridge can be adjusted using a control lever, so as to allow an adjustment of the temperature of the mixed stream by rotating the lever around an axis, and the flow rate of the mixed stream by rotating the lever around a second axis.

In most cases, the cartridge comprises a pair of openworked ceramic discs, one being stationary and the other moving under the action of the lever while being in planar, sliding and sealed contact with the stationary disc. Based on the position of the moving disc on the stationary disc, channels are formed to allow the intake of cold and hot water streams within the cartridge, with a higher or lower flow rate, and thus to cause their mixing to form the mixed stream.

Patent FR-B-2,876,433 describes a cartridge with ceramic discs for a mixing tap, additionally including thermostatic means including a seal for a hot water passage upstream from the discs, and a thermostatic element including both a heat-sensitive part arranged on the path of the mixed stream, and a translatable part relative to the heat-sensitive part, translatably connected to the seal. The thermostatic means thus make it possible, when the temperature of the mixed stream exceeds a predetermined threshold value, to seal the hot water passage, by moving the seal under the action of the heat-sensitive part. The temperature of the mixed stream is thus automatically limited by the thermostatic means.

Nevertheless, in case of accidental overpressure within the hot water passage, for example caused by a water hammer, i.e., a pressure impact, the thermostatic means may be ejected from their housing, which can cause hot water to leak directly into the mixed stream, downstream from the discs, the hot water passing directly through the housing of the thermostatic means thus left partially vacant. This leak is detrimental from an economic perspective, and dangerous due to burn risks for users.

FR-A1-2,424,459 describes a mixing tap with a hot water intake, a cold water intake, ceramic mixing means and a mixed water output chamber, in which the heat-sensitive part of a thermostatic element extends. In this known mixing tap, in case of accidental overpressure within the cold water intake, the thermostatic element may also be ejected toward the outlet, thus causing cold water to leak at the outlet.

Consequently, the invention aims to propose a new mixing unit, for a mixer tap, that is safer and more reliable.

The invention relates to a mixing unit (2; 102; 202) for a mixer tap (1), which comprises:
- a first inlet (19) for a first incoming stream (F1, F2, F3) of fluid having a first temperature (Tf),
- a second inlet (21) for a second incoming stream (C1, C2, C3) of fluid having a second temperature (Tc) higher than the first temperature,
- mixing means (13) for mixing the first and second incoming streams to form an output stream (M1, M2, M3, M4),
- an outlet (47) for the output stream,
- thermostatic means comprising:
  - a thermostatic element (73; 173; 273) including both a heat-sensitive part (75; 175) arranged at least partially in the outlet, and a moving part (77) translatable relative to the heat-sensitive part along the first axis (X73),
  - a seal (87) of the second inlet connected to the moving part (77) in translation along the first axis, and
  - a housing (79; 179), which places the outlet in communication with the second inlet along the first axis, and in which the thermostatic element is housed so as to tightly seal the communication between the outlet and the second inlet, the mixing unit (2; 102; 202) being characterized in that the outlet (47) comprises a stop (91; 191) designed to retain the heat-sensitive part (75) in translation along the first axis (X73), in a direction (D2) parallel to the first axis (X73) and opposite the seal, the stop (91; 191) limiting the travel space of the thermostatic element (73; 173; 273) outside the housing (79; 179) to thus avoid a break in the tightness of the housing (79; 179).

Owing to the invention, the movement space of the thermostatic element outside its housing is limited by the stop. Thus, if the heat-sensitive element is ejected due to an accidental overpressure in the second intake, which may in particular occur in case of water hammer while the seal is closed, the heat-sensitive element cooperates with the stop such that the sealing of the housing remains guaranteed, while preventing a passage from being opened in the housing that would allow the second incoming stream to escape toward the outlet.

Other advantageous features of the invention as follows:

The mixing unit (2) according to an embodiment is characterized in that the heat-sensitive part (75) is mounted bearing without play against the stop (91).

The mixing unit (102; 202) according to an embodiment herein is characterized in that it comprises a fastening element (95; 295) via which the heat-sensitive part (175) is secured to the housing (179), the heat-sensitive part being placed at a play distance ($d_j$) from the stop (191), and being provided with a peripheral sealing gasket (85) guaranteeing the tightness of the seal of the housing (79) by the heat-sensitive part, the sealing gasket (85) being in annular contact with the wall of the housing over a distance ($d_c$), measured parallel to the first axis (X73), which is greater than the play distance ($d_j$).

The mixing unit (2; 102; 202) according to any one of the embodiments herein is characterized in that the outlet (47) is delimited by a peripheral wall whereof a portion, forming the stop (91), is substantially planar and oriented substantially orthogonally to the first axis (X73).

The mixing unit (2; 102; 202) according to any one of the embodiments herein is characterized in that the seal (87) is arranged relative to the moving part (77) such that the latter can push the seal in a second direction (D1) opposite the direction (D2), to a position sealing the second inlet (21), the mixing unit further comprising a return spring (89) designed to return the seal in the direction (D2), to an open position of the second inlet.

The mixing unit (2; 102; 202) according to any one of the embodiments herein is characterized in that the heat-sensitive part (75) comprises, along the first axis (X73):
- a cup (81) via which the stop (91, 191) is designed to retain the heat-sensitive part (75), the cup extending in the passage of the output stream (M1, M2, M3, M4) at the outlet (47), and closing a thermodilatable body,
- a guide (83) of the moving part (77), in which the housing (79) extends from the cup (81) and is provided with a peripheral sealing gasket (85) in order to guarantee the tightness of the sealing of the housing (79) by the heat-sensitive part, including when the heat-sensitive part is retained by the stop (91, 191).

The mixing unit (2; 102; 202) according to any one of the embodiments herein is characterized in that it has a general cylindrical shape defining a main axis (X4) orthogonal to the first axis (X73), the mixing unit comprising a lower face (24) on the surface of which the first inlet (19) and the second inlet (21) emerge, the second inlet being extended by a baffled pipe (32) comprising a sealable part (29) of the seal (87), the sealable part (29) extending substantially coaxially to the first axis, and which connects the second inlet (21) to the mixing means (13), the stop (91, 191) being traversed by the first axis.

The mixing unit (2; 102; 202) according to any one of the embodiments herein is characterized in that it comprises a cartridge (11) containing the mixing means (13) on the one hand, and an additional case (15; 115; 215) that is mounted bearing against the cartridge, and which includes the thermostatic means, on the other hand.

The mixing unit (2; 102; 202) according to any one of the embodiments herein is characterized in that it comprises a control member (7), the mixing means (13) including a mixing chamber (27) containing a set of mixing discs (13A, 13B, 13C), which are made from ceramic, and at least one of which is actuated by the control member, to control the respective flow rate of the first incoming stream (F1, F2, F3) and the second incoming stream (C1, C2, C3) and to adjust both the temperature and the flow rate of the output stream (M1, M2, M3, M4) by acting on the control lever.

The invention also relates to a mixer tap (1), which is equipped with a mixing unit (2; 102; 202) according to any one of the embodiments herein.

Figure 2:
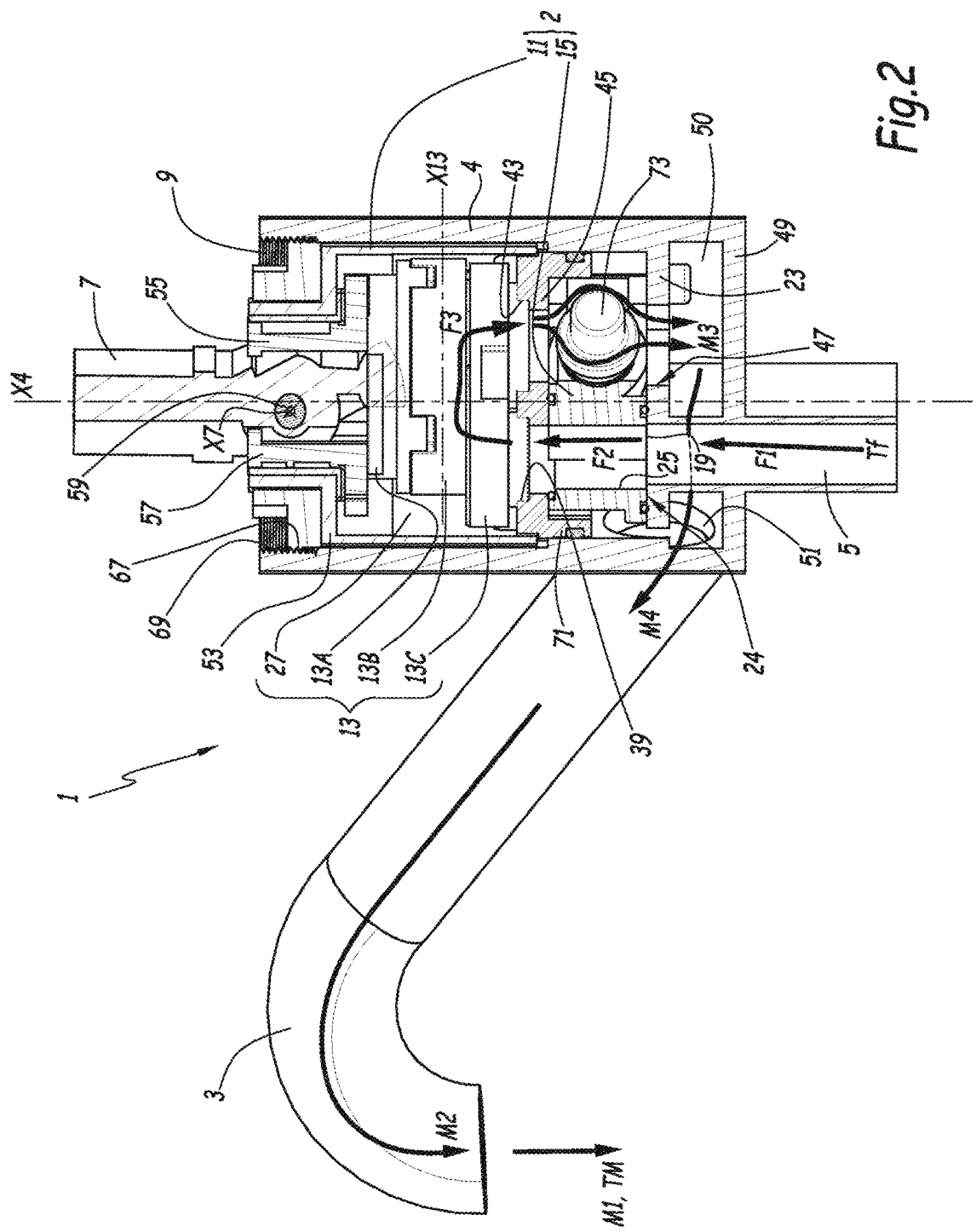

FIGS. 1 and 2 illustrate a mixer tap 1 in which a mixing unit 2 is inserted. The mixing tap 1 is preferably designed to be installed on a basin of the sink or shower type, or more generally within a household installation. The mixer tap 1 traditionally comprises a tip 3 from which a stream of mixed water illustrated by arrow M1 is intended to be emitted. The tap 1 also comprises a body 4, which forms a hollow cylinder defining a main axis X4 that is intended to be arranged vertically when the tap is mounted on the household installation.

For convenience, the rest of the description is oriented relative to the main axis X4, considering that the terms "upper" and "top" correspond to an axial direction turned toward the upper part in FIG. 1, while the terms "lower" and "bottom" correspond to an axial direction in the opposite sense.

The tip 3 forms a curved pipe that extends from the body 4 obliquely relative to the main axis X4, upward, the curve of the tip 3 making it possible to orient the mixed water stream M1 downward. The mixed water stream thus progresses obliquely upward within the tip according to arrow M2 to the free end of the latter.

The mixer tap 1 also comprises a cold water intake 5, which is visible in FIG. 2, and a hot water intake 6, which is visible in FIG. 1, that are connected to the body 4 at a lower end of the latter. The cold water intake 5 and the hot water intake 6 are provided to be connected to traditional water supply means of the household installation, which are not outlined in the present description. The cold water progresses upward in the intake 5, along arrow F1, at a temperature Tf. The hot water in turn progresses upward in the intake 6, along arrow C1, at a temperature Tc. The streams C1 and F1 are mixed within the mixer tap 1 to form the stream M1, with a temperature $T_M$ comprised between Tf and Tc, and with a combined flow rate from streams C1 and F1.

The mixing unit 2 is housed within the body 4, while being inserted in the latter via an upper opening 9 of the body 4 along the main axis X4. The incoming streams F1 and C1 are mixed within this mixing unit 2 in order to form the output stream M1.

The mixing unit 2 has a generally cylindrical shape coaxial to the main axis X4. The mixing unit 2 comprises a cartridge 11, on the one hand, which contains means 13 for mixing the first incoming stream F1 and the second incoming stream C1 to form the output stream M1, and an additional case 15, on the other hand, which is mounted bearing upwardly against a lower wall 45 of the cartridge 11 along the main axis X4, such that the cartridge 11 is situated in the upper part of the body 4, above the additional case 15 that is situated in the lower part of the body 4.

The additional case 15 has a lower face 24 by which it in turn downwardly bears against a bearing wall 23 of the body 4. The latter is substantially discoid and extends radially relative to the main axis X4. The intakes 5 and 6 for the incoming streams F1 and C1 traverse the bearing wall 23 to supply the additional case 15 via the lower face 24. In practice, the intakes 5 and 6 are respectively sealably connected to a first inlet 19 for the first incoming stream 1, and a second inlet 21 of the second incoming stream C1 emerging on the surface of the lower face 24.

As illustrated in FIG. 2, the first incoming stream progresses along arrow F1 to the first inlet 19 and continues its travel through the additional case 15 from bottom to top along arrow F2 in a through pipe 25 of the additional case 15 extending parallel to the main axis X4 from the first inlet 19. The through pipe 25 guides the first incoming stream F2 to a mixing chamber 27 of the cartridge 11. The mixing chamber 27 belongs to the mixing means 13. In parallel, as illustrated in FIG. 1, the second incoming stream enters the additional case 15 via the second inlet 21 and circulates from bottom to top along arrow C2 through the additional case 15 in this baffled pipe 32, which generally extends from bottom to top from the second inlet 21. In the case at hand, this baffled pipe 32 comprises a first part 31 substantially parallel to the main axis X4 and extending from the second inlet 21. The baffled pipe 32 next comprises a sealable part 29, by a seal 87 that is described in more detail below, the sealable part 29 extending the first part 31. Lastly, the baffled pipe 32 comprises a third part 35 substantially parallel to the main axis X4 leading the second incoming stream C2 to the cartridge 11 and extending the sealable part 29. The sealable part 29 extends orthogonally to the first part 31 and the third part 35, such that the baffled pipe 32 forms an "S". The third part 35 emerges in the mixing chamber 27. Thus, the two incoming streams F2 and C2 are allowed within the mixing chamber 27 of the cartridge 11 to be mixed and form the output stream M1 and M2.

The second mixing chamber 27 comprises an intake 39 for the first stream F1, a second intake 41 for the second stream C1, and an outlet 43 for the output stream M1. The intakes 39, 41 and the outlet 43 emerge on the surface of the lower wall 45 of the cartridge 11. In the case at hand, the lower wall 45 is generally discoid, centered on the main axis X4, the intakes 39 and 41 as well as the outlet 43 being distributed around the main axis X4.

In the illustrated example, the mixing means 13 comprise a set of mixing discs 13A, 13B and 13C that are contained in the mixing chamber 27. The mixing discs 13A, 13B and 13C are in surface contact with one another and extend in planes orthogonal to the main axis X4. The set of mixing discs comprises an upper disc 13A, an intermediate disc 13B and a lower disc 13C, the upper 13A and intermediate 13B discs being movable relative to the disc 13C, which is stationary, the intermediate disc 13B being in sliding and sealed contact with the disc 13C. The intermediate 13B and lower 13C discs comprise a system of channels and suction eyes, not shown, which is connected to the intakes 39 and 41 and to the outlet 43 and which, depending on the relative position of the discs 13B and 13C, adjusts the respective flow rate of the incoming streams F2 and C2 allowed within the set of discs through the intakes 39 and 41. As shown by arrows F3 and C3, the incoming streams circulate in the system of channels and suction eyes and first pass through the lower disc 13C, then in the intermediate disc 13B, where they are placed in contact to be mixed and form the output stream M3. The output stream M3 is a temperature $T_M$, the ratio of the flow rates of the incoming streams F3 and C3 making it possible to adjust the temperature $T_M$, and the value of the flow rates of the incoming streams F3 and C3 making it possible to adjust the flow rate of the output stream M1. The incoming streams F3 and C3 next circulate through the lower disc 13C from top to bottom. In practice, the passage section of the incoming streams F3 and C3 varies based on the relative position of the discs 13B and 13C, by placing the aforementioned channels and suction eyes in communication. The ceramic discs and their system of channels are not described in more detail because they constitute mixing means that are well known as such, and for example described in FR-B1-2,876,433. It will also be understood that, if one prefers the implementation of a mixing chamber with ceramic discs, any known mixing means typically used in cartridges for mixing taps can be used instead.

The output stream M3 formed by mixing within the mixing chamber 27 is then discharged outside the latter, and outside the cartridge 11, into an output chamber 37 of the additional case 15, leading the output stream M3 from top to bottom to an outlet 47 arranged through the bearing wall 23.

As in particular shown in FIG. 3, exclusively illustrating the additional case 15 and the lower wall 45 of the cartridge 11, seen from below, the output chamber 37, the through pipe 25 connected to the first inlet 19 and the sealable pipe 29 connected to the second inlet 21 are distributed around the main axis X4. Likewise, the intakes 5, 6 and the outlet 47 are distributed around the main axis X4.

The output stream M3 is thus poured into a lower chamber 50 of the body 4 via the outlet 47. In practice, the cartridge 11 comprises a sealing ring 71 that is centered on the main axis X4 and that protrudes downward from the lower wall 45, while extending around the additional case 15, so as to be in sealed contact with the body 4. In the case at hand, the sealing ring 71 includes a peripheral wall 93, which extends inside the sealing ring 71, which is substantially cylindrical and centered on the main axis X4, the peripheral wall 93 encircling the additional case 15, and defining part of the output chamber 37. The mixer tap 1 also comprises a substantially discoid bottom 49 orthogonal to the main axis X4, which closes the body 4 at the lower end thereof. The lower chamber 50 is thus delimited by the sealing ring 71, the body 4, the bottom 49 and the bearing wall 23. The output stream M3 is led into the lower chamber 50 along arrow M4, then to the tip 3 via an access opening 51 arranged in the wall of the body 4 radially relative to the main axis X4, placing the lower chamber 50 in communication with the tip 3.

The mixing unit 2 further comprises a lever 7 that is mounted moving at the apex of the cartridge 11, so as to protrude from the body 4 via the upper opening 9, to allow a user to actuate the lever 7. Actuating the lever 7 makes it possible to control the mixing means 13, and in particular to rotate the upper 13A and intermediate 13B discs around an axis parallel to the main axis X4, or around the axis X4 itself, and to translate them along an axis X13 that is orthogonal to the main axis X4. In general, the lever 7 forms a control member to actuate at least one of the discs 13A, 13B and 13C, and thus to control the respective flow rate of the first incoming stream F1 and the second incoming stream C1. Thus, the control member 7 makes it possible to adjust both the temperature and the flow rate of the output flow M1 by adjusting the relative position of the discs of the set of discs 13A, 13B and 13C. The mixer tap 1 and the cartridge 11 can thus be described as "single control" inasmuch as the lever 7 makes it possible to control both the flow rate and the temperature of the output stream M1 by adjusting the flow rates of the incoming streams F1 and C1. In practice, the lever 7:
- pivots around the main axis X4, which causes the upper discs 13A and 13B to rotate around this same axis, in order to adjust the ratio between the flow rate of the first and second incoming streams F1 and C1, and therefore the temperature of the output stream M1, and
- pivots around a second axis X7 that is orthogonal to the main axis X4 in order to translate the upper discs 13A and 13B along the axis X13 and to evenly vary the flow rate of the first and second streams, to adjust the flow rate of the output stream.

The lever 7 is connected to the set of discs 13A, 13B and 13C, i.e., to the mixing means 13, by a maneuvering mechanism that is not described in more detail, inasmuch as it is well known in itself.

In practice, the cartridge 11 comprises a lid 53, which forms its outer enclosure and has a substantially cylindrical shape with a circular base around the main axis X4. The lid 53 contains the mixing means 13 and the base of the lever 7, and forms a substantially cylindrical upper neck 55 centered on the main axis X4, and within which a rotary support 57 of the lever 7 is mounted rotating around the main axis X4. The lever 7 traverses the rotary support 57 and is mounted on the latter via a hinge pin 59 of the lever 7 with respect to the rotary support 57 around the axis X7. In this example, the set of discs 13A, 13B and 13C is mounted between the rotary support 57 and the lower wall 45 of the cartridge 11, which delimit the mixing chamber 27 with the lid 53.

Furthermore, the lid 53 comprises, at the base of the upper neck 55, a crown 63, via which a nut 65 centered around the main axis X4 presses the mixing unit 2 against the bearing wall 23. In practice, the nut 65 includes an outer thread 67 that is screwed in an inner thread 69 of the upper opening 9 of the body 4, these threads 67 and 69 being centered on the main axis X4.

The mixing unit 2 also comprises thermostatic means, in particular visible in FIG. 1. They first comprise a thermostatic element 73, extending along a first axis X73 comprised in the plane of FIG. 1, and extending substantially perpendicular to the main axis X4. In particular, the sealable part 29 of the baffled pipe 32 extends substantially coaxially to the first axis X73. Along this first axis X73, the thermostatic element 73 includes a heat-sensitive part 75 mounted in a housing 79 of the additional case 15. The housing 79 is a pipe coaxial to the first axis X73, and which is arranged in the additional housing 15 so as to connect the output chamber 37 and the baffled pipe 32. In practice, the housing 79 thus places the outlet 47 in communication with the second inlet 21.

The heat-sensitive part 75 forms a stationary part of the thermostatic element 73 and in particular comprises, along the first axis X73, a cup 81 that protrudes from the housing 79 and that extends in the passage of the output flow M3 at the outlet 47. The cup 81 has a generally cylindrical shape with a circular base centered on the first axis X73, and contains a thermodilatable body that is for example an appropriate wax. The cup 81 being in contact with the output flow M3, the thermodilatable body expands and contracts based on the temperature $T_M$ of the output flow M3.

The heat-sensitive part 75 also comprises a guide 83, which extends the cup 81 along the first axis X73, and via which the heat-sensitive part 75 is mounted in the housing 79. The guide 83 has a shape of revolution around the first axis X73 and extends within the housing 79. The guide 83 closes off the housing 79 sealably, in order to substantially prevent any transfer of water from the second stream C2 entering the outlet 47. In practice, the guide 83 is provided with a peripheral sealing gasket 85, centered on the first axis X73, via which the heat-sensitive part is mounted in the housing 79. The sealing gasket 85 guarantees the tightness of the sealing of the housing 79 by the heat-sensitive part 75. A collar 86 is provided around the guide 83, against which collar 86 the sealing gasket 85 bears axially, the collar 86 being arranged on the side of the cup 81 in order to retain the sealing gasket 85 in axial translation toward the cup 81. The thermostatic element 73 is thus housed in the housing 79 so as to tightly seal the communication between the outlet 47 and the second inlet 21.

The thermostatic element 73 also comprises a moving part 77, which forms a cylindrical piston coaxial to the first axis X73. The moving part 77 is mounted within the guide 83, so as to be able to translate relative to the heat-sensitive part 75 at a distance from the heat-sensitive part 75, toward the baffled pipe 32, along the first axis X73 under the action of the heat-sensitive body contained in the cup 81.

A seal 87, belonging to the aforementioned thermostatic means, is provided within the sealable part 29, and is designed to be translated along the first axis X73 by the moving part 77. The seal 87 is arranged relative to the moving part 77 such that the latter can push the seal 87 to a position sealing the second inlet 21. In the case at hand, the moving part 77 is in contact with the seal 87 so as to be able to push the latter away from the heat-sensitive part 75 in a direction D1 parallel to the axis X73, under the action of the thermodilatable body contained in the cup 81.

The seal 87 is in practice mounted in compression between the free end of the moving part 77 and a return spring 89. The latter is in turn mounted in compression between the seal 87 and an inner shoulder of the sealable part 29 of the baffled pipe 32. A collar 88 centered on the first axis X73 is interposed between the return spring 89 and the inner shoulder. The return spring 89 is therefore a compression spring, designed to return the seal 87 in a direction D2 opposite D1, to an open position of the baffled pipe 32, and therefore of the second inlet 21.

The seal 87 thus seals the sealable part 29, and therefore the second inlet 21, with a variable degree of sealing as a function of the expansion of the thermodilatable body and therefore of the temperature $T_M$, in order to vary the flow rate of the second incoming stream C2 accordingly. When the temperature $T_M$ reaches a predetermined threshold, for example 50° C., the stream C2 is completely, or at least partially, interrupted by sealing of the second inlet 21.

The second incoming stream C1 is allowed into the mixer tap 1 with a pressure allowing it to be circulated within the pipes along arrows C1, C2 and C3 defined above, such that the thermostatic element 73 is in turn subject to this pressure, which tends to push the heat-sensitive element 75 outside the housing in the direction D2. The heat-sensitive part 75 is therefore mounted bearing, without play, against a stop 91 arranged in the peripheral wall 93 of the sealing ring 71 of the cartridge 11. The stop 91 is designed to retain the heat-sensitive part 75 in translation along the first axis X73, in the direction D2 parallel to the axis X73 and opposite the seal 87, and in particular opposite the pressure from the second incoming stream. In other words, the travel space of the thermostatic element 73 outside its housing 79 is limited by the stop 91. As illustrated in FIG. 1, the stop 91 is designed in particular to retain the cup 81. The stop 91 extends over only a portion of the peripheral wall 93, and has a substantially planar geometry, or at least corresponding to the shape of the cup 81. The stop 91 is oriented in an extension plane substantially orthogonal to the first axis X73 and is traversed by this axis, in order to be aligned axially with the housing 79 and the sealable part 29 of the baffled pipe 32. Thus, any pressure impact does not cause a break in the tightness of the housing 79, inasmuch as the stop 91 solidly retains the heat-sensitive part 75.

Figure 3:
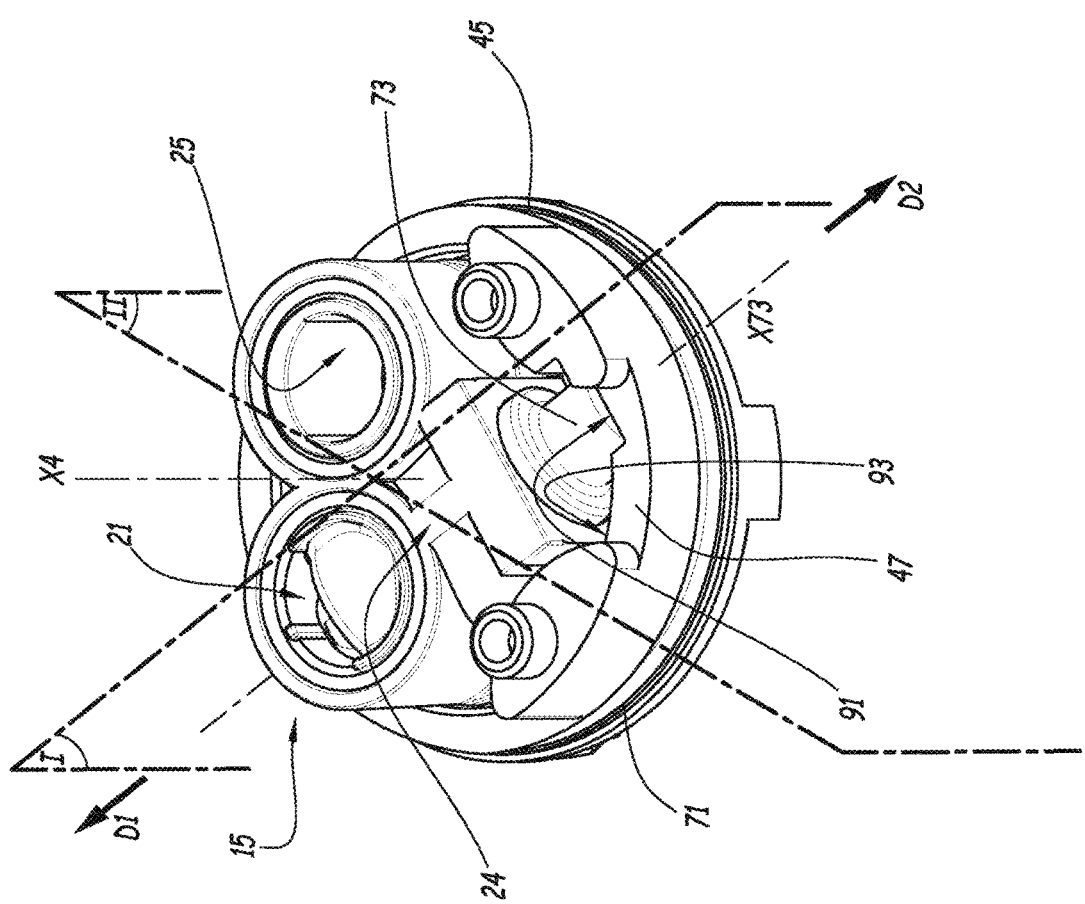
FIG. 3 is a partial perspective bottom view of the mixing unit of FIGS. 1 and 2, in which lines I-I and II-II correspond to the respective cutting lines of FIGS. 1 and 2.
Figure 4:
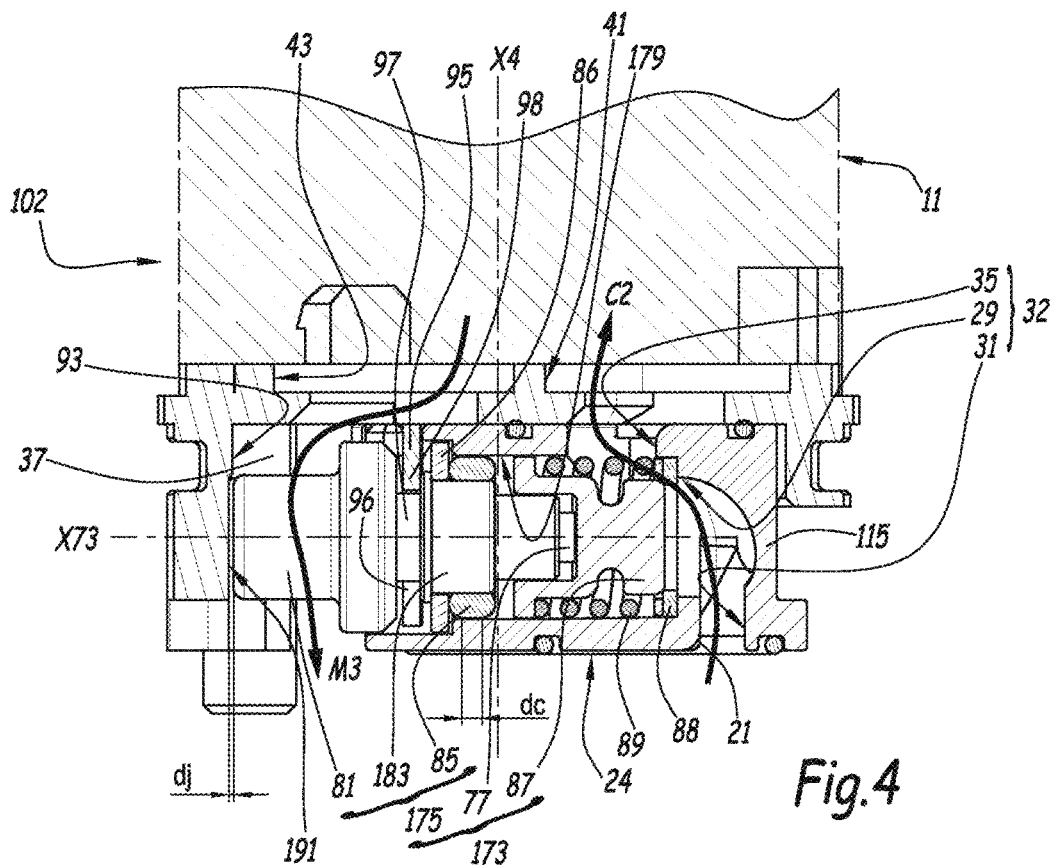
FIG. 4 is a longitudinal view in the same plane as that of FIG. 1, of a mixing unit according to a second embodiment of the invention.
Figure 5:
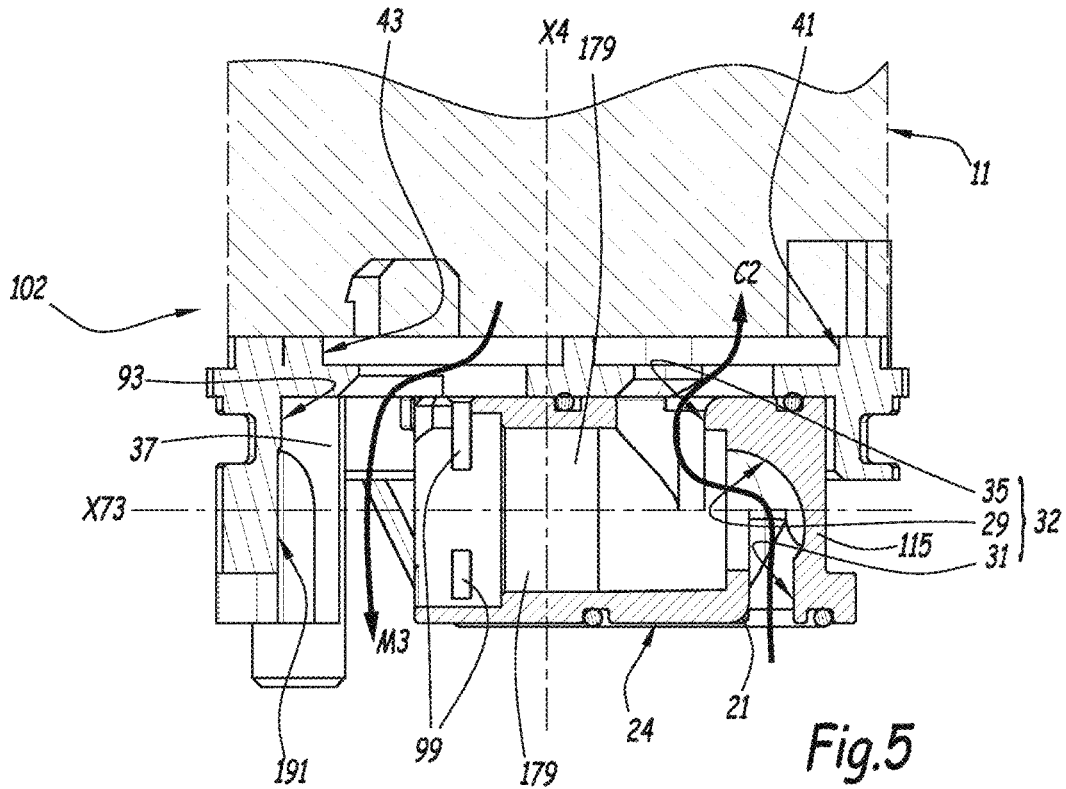
FIG. 5 is a view similar to FIG. 4, in which the thermostatic means of the mixing unit have been omitted.

FIGS. 4 and 5 illustrate a mixing unit 102 according to a second embodiment and which has features similar to the mixing unit 2 illustrated in FIGS. 1 to 3 of the first embodiment described above. The following description is therefore focused on the differences between the first and second embodiments will be described below. In particular, the reference numbers shared in FIGS. 1 to 3 and in FIGS. 4 and 5 refer to the same features and objects as described above for the first embodiment.

In particular, the mixing unit 102 comprises a cartridge 11, an additional case 115, a first inlet for a first incoming stream, a second inlet 21 for a second incoming stream C2, a baffled pipe 32, mixing means to form an output stream M3, an outlet with an outlet chamber 37, a housing 179 and a stop 191. The mixing unit 102 also comprises thermostatic means comprising a thermostatic element 173 including both a heat-sensitive part 175 and a moving part 77, on the one hand, and a seal 87, on the other hand.

FIGS. 4 and 5 exclusively show the lower wall 45 and the additional case 115 of the mixing unit 102, the features not shown and attached to the cartridge 11 as well as the mixer tap 1 being similar to those described previously. In FIG. 4, the seal 89 is shown in the closed position, such that the second stream of fluid C2 is in reality not allowed into the additional case 115. Arrow C2 is, however, shown as if the seal 89 was in the open position.

In this second embodiment, the heat-sensitive part is connected in translation along the first axis X73 via a U-shaped yoke 95. In the case at hand, the yoke 95 comprises two legs 96 that are substantially parallel to one another, and perpendicular to the first axis X73, and comprises a connecting part 98 connecting the legs 96 to one another. Bearing notches 99 of the yoke 95 are arranged in the wall of the housing 179, such that the yoke 95 is secured to the latter. Furthermore, the yoke 95 is arranged bearing against a diameter restriction 97 of the guide 183 of the heat-sensitive part 175 so as to mechanically oppose the translation of the latter in direction D2 relative to the housing 179. In the case at hand, the yoke 95 straddles the heat-sensitive part 175, such that the legs 96 extend on either side thereof.

The cup 81 of the heat-sensitive part 175 is placed at a play distance $d_j$ from the stop 191, and therefore does not bear against the latter. The play distance $d_j$ is measured parallel to the first axis X73. Thus, if the pressure from the second incoming stream were to ruin, or even destroy, the yoke 95 or the notches 99, the yoke 95 would no longer perform its function of keeping the thermostatic element 173 within the housing 179, the heat-sensitive part 175 would be moved along direction D2 over a distance corresponding to the play distance $d_j$, after which the heat-sensitive part 175 would abut against the stop 191. In other words, the travel space of the thermostatic element 173 outside its housing 179 is limited by the stop 191. The play distance $d_j$ is short enough for this movement of the heat-sensitive part 175 not to open a passage that would allow the second incoming stream C2 to leak toward the outlet chamber 37. In particular, the wall of the housing 179 and the sealing gasket 85 are in annular contact over a distance dc, measured parallel to the first axis X73, greater than the play distance dj. Thus, the sealing gasket 85 has a sufficient thickness to guarantee tightness, including when the heat-sensitive part 75 abuts against the stop 191.

Figure 6:
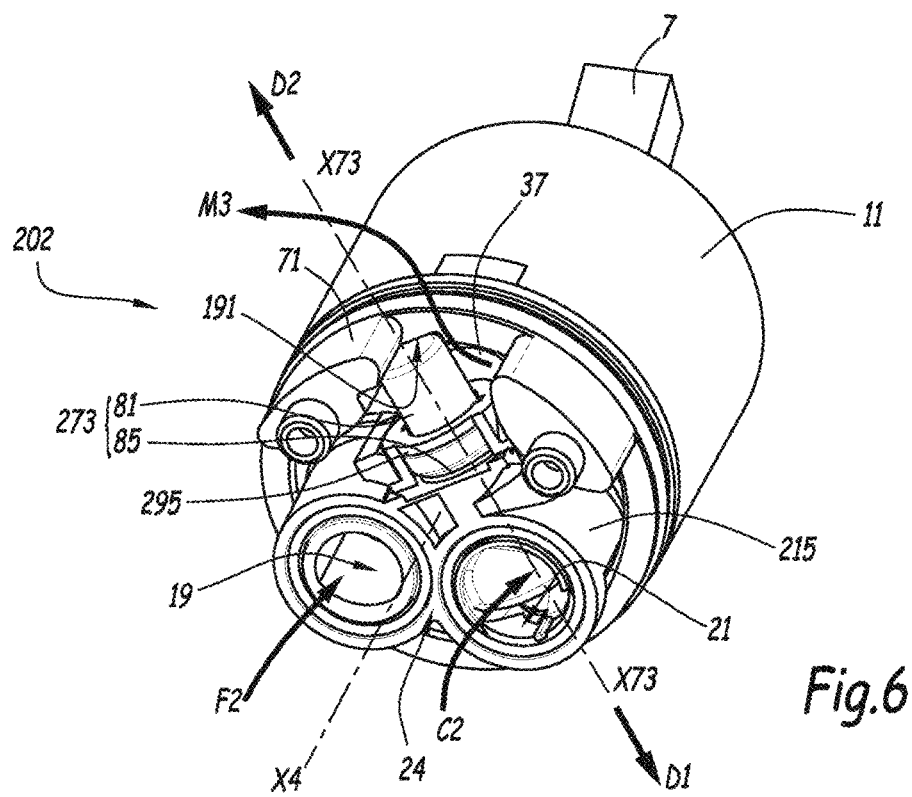
FIG. 6 is a perspective bottom view of a mixing unit according to a third embodiment.
Figure 7:
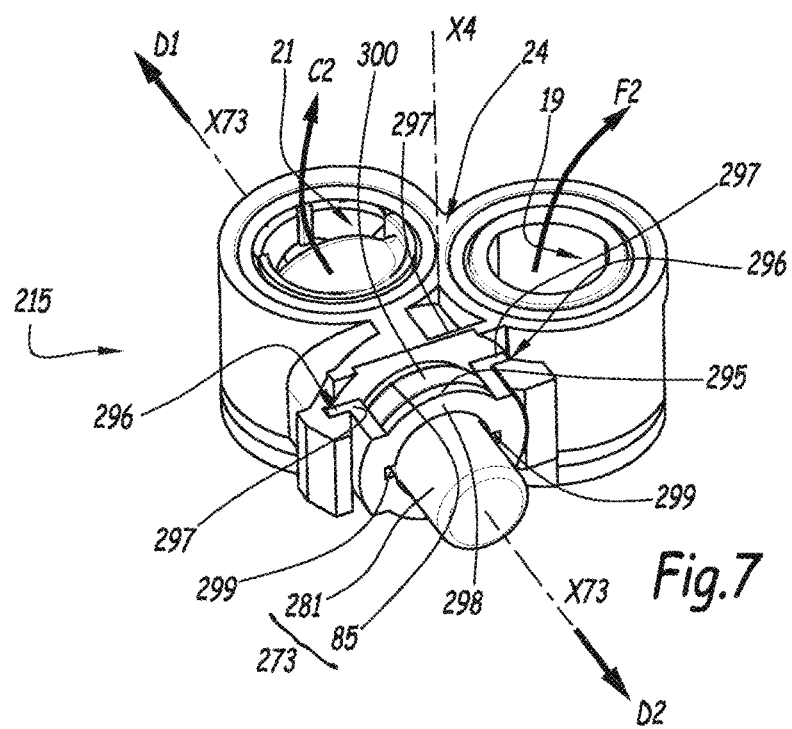
FIG. 7 is a perspective view of an embodiment detail of the mixing unit of FIG. 6.

FIGS. 6 and 7 illustrate a mixing unit 202 according to a third embodiment and which has features similar to the mixing units 2 and 102 of the embodiments described above and illustrated in FIGS. 1 to 5. The following description is therefore focused on the differences between the first and second embodiments will be described below. In particular, the reference numbers shared in FIGS. 1 to 5 and in FIGS. 6 and 7 refer to the same features and objects as described above for the first and second embodiments.

In particular, the mixing unit 202 comprises a cartridge 11, an additional case 215, a first inlet 19 for a first incoming stream, a second inlet 21 for a second incoming stream C2, a baffled pipe, mixing means to form an output stream M3, an outlet with an outlet chamber 37, a housing and a stop 191. The mixing unit 202 also comprises thermostatic means comprising a thermostatic element 273 including both a heat-sensitive part, arranged at a play distance from the stop 191, and a moving part 77, on the one hand, and a seal, on the other hand.

The mixing unit 202 has no U-shaped yoke, but comprises a so-called "quarter-revolution" yoke 295 that performs a similar function of maintaining the thermostatic element 273 in translation relative to the case 215 along the first axis X73. In the case at hand, the yoke 273 is shown in a blocking orientation around the first axis X73, in which it bears in direction D2 via branches 297 on two lugs 296. The branches 297 each protrude radially relative to a main crown 298 of the yoke 295, which surrounds a shoulder 300 of the cup 281. The shoulder 300 is, in the case at hand, bearing on the main crown 298, in a plane orthogonal to the first axis X73. The branches 297 each extend along a portion of the circumference of the main crown 298 and are inserted within lugs 296. By quarter revolution of the yoke 295 around the first axis X73, the branches 297 are freed from the lugs 296, which allows a translation of the yoke 295 and the thermostatic element 273 along the first axis X73. In order to be able to perform this rotation using a tool, not shown, the yoke 295 is provided with notches 299 for receiving said tool.

In the above examples, streams of water are used. However, other fluids can be used in place of water, preferably streams of liquid fluids. In general, the intake 5 corresponds to an intake for a first incoming stream F1 of fluid having a first temperature Tf, while the intake 6 corresponds to an intake for a second incoming stream C1 of fluid having a second temperature Tc that is higher than the first temperature Tf. The fluids of the first incoming stream F1 and the second incoming stream C1 are preferably identical and liquid, but may nevertheless be of different natures. The water escaping from the tip 3 thus corresponds to an output stream M1 of fluid, which is formed by mixing first and second incoming streams F1 and C1 within the mixer tap 1.

The embodiments and alternatives defined above may be combined to create new embodiments.

What is claimed is:

1. A mixing unit for a mixer tap, which comprises:
   a first inlet for a first incoming stream of fluid having a first temperature,
   a second inlet for a second incoming stream of fluid having a second temperature higher than the first temperature,
   a mixer for mixing the first and second incoming streams to form an output stream, an outlet for the output stream,
a thermostat comprising:
- a heat-sensitive part arranged at least partially in the outlet, and a moving part translatable relative to the heat-sensitive part along a first axis,
- a seal of the second inlet connected to the moving part in translation along the first axis, and
- a housing, configured to place the outlet in communication with the second inlet along the first axis, and wherein the heat sensitive part and the moving part are housed so as to tightly seal the communication between the outlet and the second inlet,
- the outlet comprises a stop designed to retain the heat-sensitive part in translation along the first axis, in a direction parallel to the first axis and opposite the seal, the stop limiting the travel space of the heat sensitive part and the moving part are outside the housing to thus avoid a break in the tightness of the housing,
- wherein the outlet is delimited by a peripheral wall whereof a portion, forming the stop, is substantially planar and oriented substantially orthogonally to the first axis.

2. The mixing unit according to claim 1, wherein the heat-sensitive part is mounted bearing without play against the stop.

3. The mixing unit according to claim 1, wherein it comprises a fastener via which the heat-sensitive part is secured to the housing, the heat-sensitive part being placed at a play distance from the stop, and being provided with a peripheral sealing gasket guaranteeing the tightness of the seal of the housing by the heat-sensitive part, the sealing gasket being in annular contact with the wall of the housing over a distance, measured parallel to the first axis, which is greater than the play distance.

4. The mixing unit according to claim 1, wherein the seal is arranged relative to the moving part such that the latter can push the seal in a second direction opposite the direction, to a position sealing the second inlet, the mixing unit further comprising a return spring designed to return the seal in the direction, to an open position of the second inlet.

5. The mixing unit according to claim 1, wherein the heat-sensitive part comprises, along the first axis:
- a cup via which the stop is designed to retain the heat-sensitive part, the cup extending in the passage of the output stream at the outlet, and closing a thermodilatable body,
- a guide of the moving part, wherein the housing extends from the cup and is provided with a peripheral sealing gasket in order to guarantee the tightness of the sealing of the housing by the heat-sensitive part, including when the heat-sensitive part is retained by the stop.

6. The mixing unit according to claim 1, wherein it has a general cylindrical shape defining a main axis orthogonal to the first axis, the mixing unit comprising a lower face on the surface of which the first inlet and the second inlet emerge, the second inlet being extended by a baffled pipe comprising a sealable part of the seal, the sealable part extending substantially coaxially to the first axis, and which connects the second inlet to the mixer, the stop being traversed by the first axis.

7. The mixing unit according to claim 1, wherein it comprises:
- a cartridge containing the mixer, and
- an additional case that is mounted bearing against the cartridge, and which comprises the thermostat.

8. The mixing unit according to claim 1, wherein it comprises a control member, the mixer comprising a mixing chamber containing a set of mixing discs, which are made from ceramic, and at least one of which is actuated by the control member, to control the respective flow rate of the first incoming stream and the second incoming stream and to adjust both the temperature and the flow rate of the output stream by acting on the control member.

9. A mixer tap, which is equipped with a mixing unit according to claim 1.

10. A mixing unit for a mixer tap, which comprises:
- a first inlet for a first incoming stream of fluid having a first temperature,
- a second inlet for a second incoming stream of fluid having a second temperature higher than the first temperature,
- a mixer for mixing the first and second incoming streams to form an output stream,
- an outlet for the output stream,
- a thermostat comprising:
  - a heat-sensitive part arranged at least partially in the outlet, and a moving part translatable relative to the heat-sensitive part along a first axis,
  - a seal of the second inlet connected to the moving part in translation along the first axis, and
  - a housing, configured to place the outlet in communication with the second inlet along the first axis, and wherein the heat sensitive part and the moving part are housed so as to tightly seal the communication between the outlet and the second inlet,
  - the outlet comprises a stop designed to retain the heat-sensitive part in translation along the first axis, in a direction parallel to the first axis and opposite the seal, the stop limiting the travel space of the heat sensitive part and the moving part are outside the housing to thus avoid a break in the tightness of the housing,
  - wherein the mixing unit comprises a fastener via which the heat-sensitive part is secured to the housing, the heat-sensitive part being placed at a play distance from the stop, and being provided with a peripheral sealing gasket guaranteeing the tightness of the seal of the housing by the heat-sensitive part, the sealing gasket being in annular contact with the wall of the housing over a distance, measured parallel to the first axis, which is greater than the play distance.

11. The mixing unit according to claim 10, wherein the heat-sensitive part is mounted bearing without play against the stop.

12. The mixing unit according to claim 10, wherein the outlet is delimited by a peripheral wall whereof a portion, forming the stop, is substantially planar and oriented substantially orthogonally to the first axis.

13. The mixing unit according to claim 10, wherein the seal is arranged relative to the moving part such that the latter can push the seal in a second direction opposite the direction, to a position sealing the second inlet, the mixing unit further comprising a return spring designed to return the seal in the direction, to an open position of the second inlet.

14. The mixing unit according to claim 10, wherein the heat-sensitive part comprises, along the first axis:
- a cup via which the stop is designed to retain the heat-sensitive part, the cup extending in the passage of the output stream at the outlet, and closing a thermodilatable body,
- a guide of the moving part, wherein the housing extends from the cup and is provided with a peripheral sealing gasket in order to guarantee the tightness of the sealing of the housing by the heat-sensitive part, including when the heat-sensitive part is retained by the stop.

15. The mixing unit according to claim 10, wherein it has a general cylindrical shape defining a main axis orthogonal to the first axis, the mixing unit comprising a lower face on the surface of which the first inlet and the second inlet emerge, the second inlet being extended by a baffled pipe comprising a sealable part of the seal, the sealable part extending substantially coaxially to the first axis, and which connects the second inlet to the mixer, the stop being traversed by the first axis.

16. The mixing unit according to claim 10, wherein it comprises:
   a cartridge containing the mixer, and
   an additional case that is mounted bearing against the cartridge, and which comprises the thermostat.

17. The mixing unit according to claim 10, wherein it comprises a control member, the mixer comprising a mixing chamber containing a set of mixing discs, which are made from ceramic, and at least one of which is actuated by the control member, to control the respective flow rate of the first incoming stream and the second incoming stream and to adjust both the temperature and the flow rate of the output stream by acting on the control member.

18. A mixer tap, which is equipped with a mixing unit according to claim 10.

* * * * *